July 24, 1928.

J. J. GILBERT

SUBMARINE SIGNALING

Filed June 30, 1923     2 Sheets-Sheet 1

Inventor:
John J. Gilbert,
by C. C. Sprague, Att'y

July 24, 1928.
J. J. GILBERT
1,678,184
SUBMARINE SIGNALING
Filed June 30, 1923    2 Sheets-Sheet 2
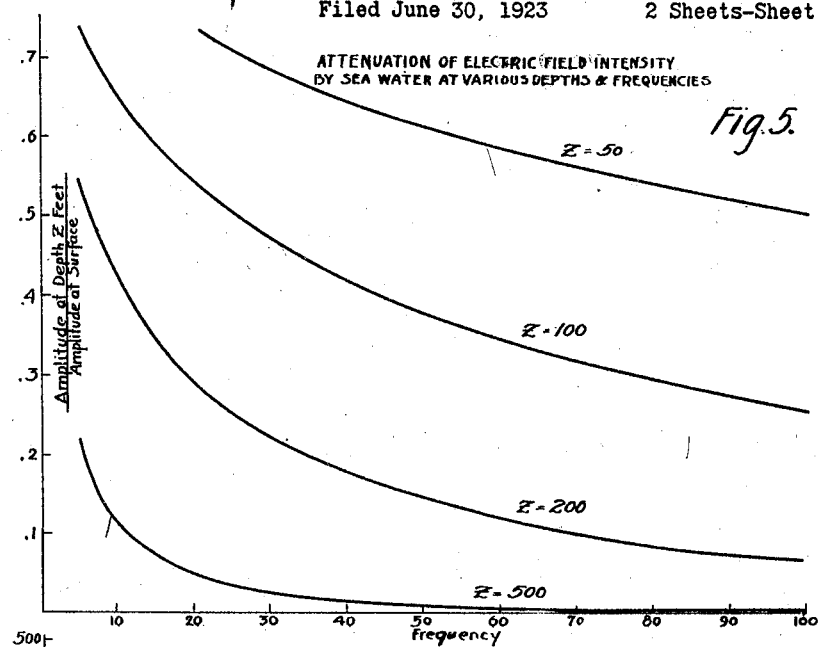
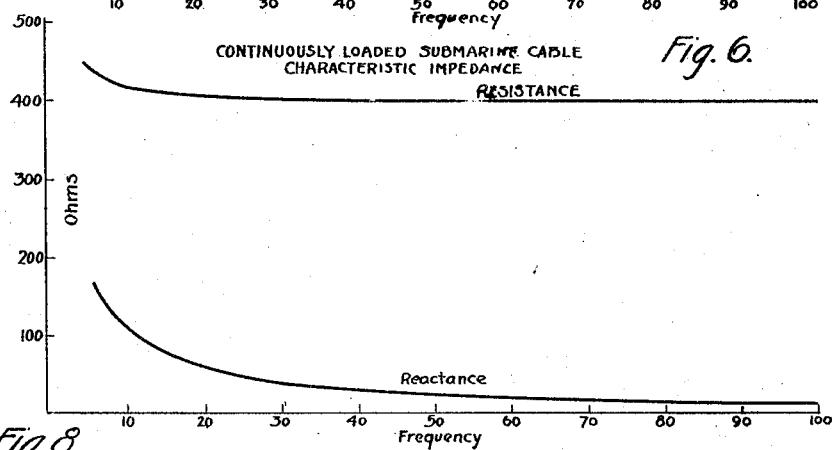
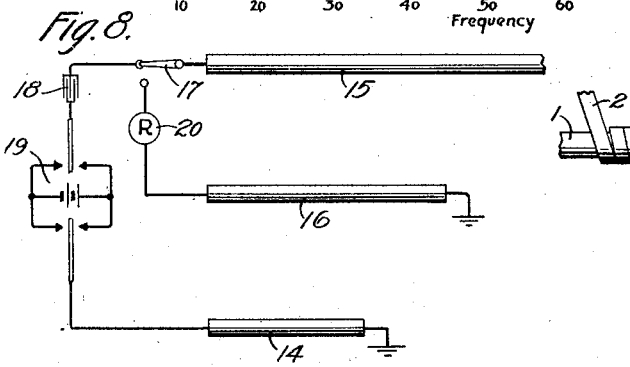
Inventor:
John J. Gilbert
by C. E. Sprague, Att'y.

Patented July 24, 1928.

1,678,184

UNITED STATES PATENT OFFICE.

JOHN J. GILBERT, OF PORT WASHINGTON, NEW YORK, ASSIGNOR TO WESTERN ELECTRIC COMPANY, INCORPORATED, OF NEW YORK, N. Y., A CORPORATION OF NEW YORK.

SUBMARINE SIGNALING.

Application filed June 30, 1923. Serial No. 648,690.

The invention relates to submarine signaling and has for an object to reduce extraneous interfering electric waves picked up by a submarine cable in order that the limit upon signal legibility set by this interference will be diminished and the speed of operation increased.

This object is accomplished by using a sea earth termination which is immersed at a depth which is sufficiently great so that the effect of the disturbing electric waves beyond that depth is negligible, advantage being taken of the fact that for a disturbance of a given frequency, there is a depth of water in which a cable will pick up only a negligible amount of disturbance. The effect of disturbing electric waves at lesser depths is made negligible by the sea earth connection by reason of the balanced relation of the main cable and that leading to the sea earth termination with respect to the receiver. These two cables have similar electrical characteristics so that interference picked up by them is of the same amount in each and in opposite direction with respect to the receiver.

Another object of the invention is to provide a terminating impedance which is simple in form and of such a construction that it may be of the same configuration as the submarine cable, in order that it may be located adjacent the sea earth termination.

Figure 1:
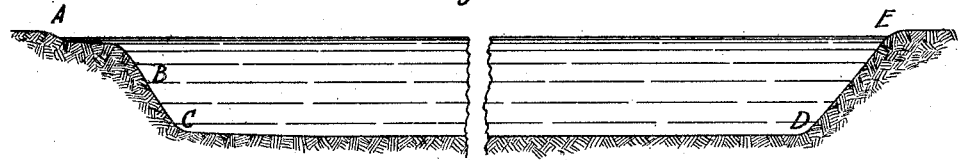
Figure 2:
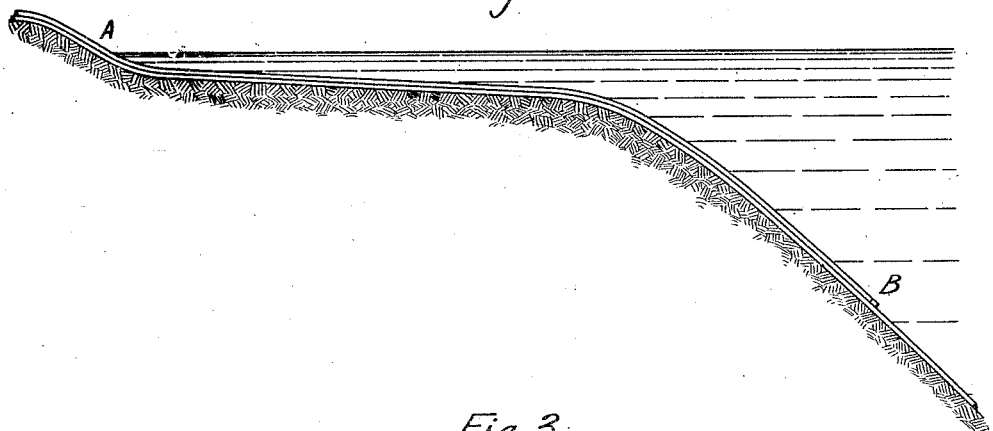
Figure 3:
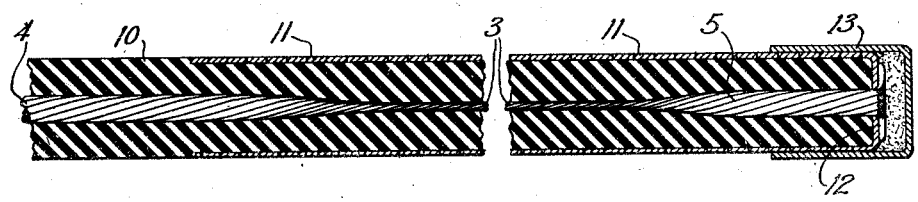
Figure 4:
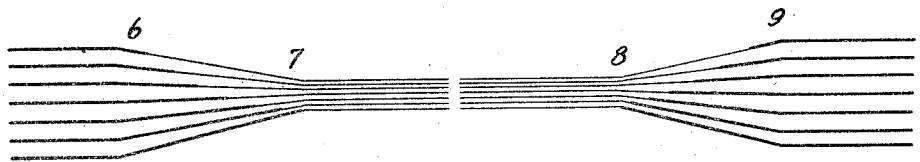

Referring to the drawings, Fig. 1 is a cross section of the ocean over the route to be traversed by the cable. Fig. 2 is an enlarged view of the western end of the cable and the ocean route. Fig. 3 is a cross section of a cable providing a terminating impedance and a sea earth termination. Fig. 4 illustrates how the high resistance wires, comprising the terminating impedance, may be soldered to the cable and to the terminal. The curves in Fig. 5 illustrate the attenuation of disturbing electric field intensities of different frequencies by sea water at various depths. The curves in Fig. 6 illustrate the variation in resistance and reactance of a continuously loaded submarine cable with frequency. Fig. 7 illustrates a loaded cable, and Fig. 8 illustrates a cable provided with separate sea earth terminations for transmitting and receiving.

Referring in detail to the drawings, it is seen from the curves in Fig. 5 that the attenuation of an extraneous electric disturbance increases for a given frequency as the depth of immersion increases. Advantage is taken of this fact to locate the sea earth termination for the cable at a point where this disturbance will be negligible. From the curves in Fig. 5, it is also apparent that high frequencies are damped out at lesser depths than lower frequencies, and, in general, the critical depth of water in which a cable will pick up only a negligible amount of disturbance is inversely proportional to the square root of the frequency, assuming that disturbances of all frequencies have the same amplitude at the surface of the water.

Whereas, according to prior practice, it has been the custom to have the sea earth termination only five miles or so from the shore and immersed in water of about fifty feet in depth, according to the present invention, it is proposed to immerse the sea earth termination to a depth of approximately five hundred feet and this will, in general, require a much longer section of sea earth cable than has been used before, and in the case of a cable between New York and the Azores, for instance, it will be advisable to use a sea earth cable about one hundred miles in length at the western end. At the eastern end a much shorter length will be required.

A cross section of an ocean cable route is illustrated in Figs. 1 and 2. From the above considerations, it will be apparent that at the western end, practically all the disturbances of frequencies which are passed by the receiving apparatus used on such a cable, that is frequencies of about one hundred cycles per second, will be picked up in the length AC, Fig. 1, the part contributed by CD being negligible on account of the great depth. In order to avoid difficulties attendant from laying heavy cable in great depths of water, the sea earth termination can be located at the point B, Fig. 2, where the bottom begins to fall off towards very great depths. The slight amount of disturbance picked up on the section BC will not be of very great effect. Similarly, on the eastern end a sea earth cable can be laid out to some point between D and E.

Although disturbances of all frequencies are received at the cable terminals, only the part that lies within a certain range of frequency is of primary importance. This is due to the fact that signals as received over a submarine cable contain a large proportion of low frequency components which must be reduced in amplitude by "correcting" networks, which are essentially high pass filters. Also it is found that for intelligible signals, frequencies which are higher than a certain multiple of the dot frequency are not required, so that low pass filters can be provided in the receiving network to remove disturbances of such frequencies. Consequently, the receiving apparatus acts as a band filter towards the interferences, and only those frequencies of disturbance which lie within this band will get into the receiving instruments. The limits of this band are set, as has been indicated, by the dot frequency of the received signals.

A preferred form of main cable, as illustrated in Fig. 7, comprises a copper conductor 1, provided with a wrapping 2 of iron-nickel alloy composed preferably of 78½% nickel and 21½% iron, as described and claimed in patent to Elmen, No. 1,586,887, June 1, 1926. The advantage of this loading material is that its permeability at small magnetizing forces of the order of 0.01 to 0.10 gauss, is from ten to twenty times that of iron, that is, from 3,000 to 6,000. With a loaded cable of this sort, it has been found, as illustrated in Fig. 6, that the characteristic impedance at the frequencies of interest in cable work, is practically a constant resistance with only a small reactance. It can be seen from these curves that for frequencies of thirty cycles and higher, a resistance of about 400 ohms will differ by only a small percentage from the characteristic impedance of the cable. Thus, a terminating impedance for the loaded cable may be composed of pure resistance. The value of resistance R to use may be computed from the equation $R = \sqrt{\dfrac{L}{C}}$ where L and C are the inductance and capacity, respectively, of the cable. Preferably, this terminating impedance is located adjacent the sea earth termination as described and claimed in the patent to Osborne, No. 1,390,580, September 13, 1921.

The arrangement illustrated in Figs. 3 and 4 may be used for forming the sea earth termination and for connecting to it the resistance which serves as the terminating impedance. A length of about seven hundred feet of high resistivity material such as nichrome 3, made up of seven strands of No. 28 gauge wire is joined at both ends to stranded copper wire 4—5 of about the same diameter as the cable conductor. The joints are made by soldering the individual strands of the copper 4—5 and the resistance wires 3 in the manner shown in Fig. 4, the several joints being distributed over a length of several feet so as to provide taper 6—7 and 8—9 between the conductors, and to strengthen the joint mechanically. The composite conductor is insulated with gutta percha or the like 10 to about the same diameter as the core of the main cable, and over this is laid a thin brass or copper tape 11 which furnishes mechanical strength and which has a low resistance contact with the sea water and serves as the sea earth termination. The high resistance conductor 3 with its terminals 4 and 5 are soldered at the end 4 to the sea earth cable conductor shown in Fig. 7, on which the loading material 2 has been terminated, and is soldered at the other end, for instance, as shown at 12, to the tape or equivalent conductor 11. If desired a protective metal cap 13 may be placed over the end of the tape 11.

The sea earth terminating network is thus made a continuation of the core of the sea earth cable and can be served with jute and armored as part of that core. All joints of different metals are well protected from the sea water so that galvanic electromotive forces are not set up.

The sea earth cable may be either enclosed in the same sheath as the main cable or in an independent sheath and it may be grounded on the armor of the main cable.

In the preceding, it has been assumed that the two cores, i. e., the main and the sea earth cable cores, are exactly alike so that they have the same electrical parameters. Lack of such equality at any point will give rise to interference, the magnitude of which can be determined by the method outlined previously. In order that the arrangement of sea earth termination that has been described shall be fully effective, it is necessary that the parameters of the two cores shall be substantially equal at all points to within a prescribed percentage.

By employing a sea earth termination of the type that has been described, the transmission efficiency of the cable will be decreased due to the presence of the terminal resistance, and to the fact that the twin core cable, in some cases one hundred miles or more in length, may have a higher attenuation constant than the single core type of cable. The advantage of the arrangement is that interference due to extraneous disturbances is diminished to a much greater extent than the transmission efficiency. In order to increase the efficiency of the cable system the sea earth cable can be cut loose from the system at the sending end and transmission can be effected by means of a direct ground at that point. It is possible, however, that the local disturbances will be of such large magnitude, that even when transmitted over the entire cable, they will cause serious interference with the signal. In such a case it would be desirable to employ the arrangement shown in Fig. 8 and according to which a third core 14 extends for a few miles from shore and is grounded on the armor of the main cable 15 or on a copper or brass tape wound around the core in the manner shown in Fig. 3. The high resistance sea earth termination illustrated in Figs. 3 and 4, is used in the sea earth cable 16 illustrated in Fig. 8. The cable 16 gives very efficient results when used for receiving purposes, and a switch 17 has been shown for connecting the main cable 15 in circuit with the receiving device 20 and the cable 16. The cable 14 being of very low resistance as compared to the cable 16, is preferable for transmitting purposes and the switch 17 is, therefore, provided to connect the main cable 15 in circuit with cable 14, a condenser 18 and the usual transmitting apparatus 19 being then connected with these cables.

It is important to note that in the case of non-loaded submarine cables the conditions are such that the method just described is of relatively small advantage. The reason is that on short cables where high signal speeds are attained and disturbances of high frequency are of importance the cable usually lies in such shallow water that there is no point at which the sea earth cable can be terminated, with the insurance that the disturbance picked up on the remainder of the cable will be of negligible effect. The same line of reasoning applies to longer cables, where the depth of submersion is likely to be greater. The frequencies involved in this case are so low that disturbances penetrate to great depths and are picked up over the entire cable.

What is claimed is:

1. A terminating impedance for a loaded cable having a resistance equal to $\sqrt{\frac{L}{C}}$ where L and C are the inductance and capacity respectively of the loaded cable.

2. A submarine signaling system comprising a submarine cable, associated receiving apparatus connected thereto, a submerged sea earth conductor extending from a connection to said receiving apparatus out to a point where the sea is a few hundred feet deep, the point being at such a distance from the receiving apparatus that disturbances originating on shore are substantially neutralized, and at such a depth that the effect of disturbing electric waves picked up beyond this point on the cable is substantially negligible, a sea earth termination, and a terminating impedance of substantially pure resistance connecting the sea terminal of said sea earth conductor to said sea earth termination, the terminating impedance serving to terminate the sea earth conductor in such an impedance, at a frequency in the neighborhood of the dot frequency, as to prevent reflections at said sea terminal at said frequency.

3. The method of attenuating disturbances picked up by a submarine cable employing a sea earth termination which comprises immersing said sea earth termination to a depth of the order of five hundred feet.

4. A loaded submarine cable, a high resistance receiving circuit therefor, a low resistance transmitting circuit therefor, and means for alternately connecting said circuits to said cable.

5. In combination, a long, deep sea cable conductor, a return conductor of similar electrical characteristics extending adjacent said cable conductor from shore to a point at which the water is of considerable depth and functioning to balance an equal length of the sea cable conductor, a terminating impedance insulated from the sea having one terminal connected to the sea terminal of the return conductor and having its other terminal connected to earth, and receiving apparatus connected to the two conductors at their adjacent shore terminals.

6. In combination, a loaded, long, deep sea cable conductor, a conductor of similar electrical design extending adjacent said cable conductor from shore to a point at which the water is of such depth as to attenuate disturbances propagated from the surface down to the conductors to a small fraction of their surface magnitude, said return conductor having a connection to earth in the vicinity of said point, and receiving apparatus connected to the two conductors at their adjacent shore terminals.

7. In combination, a long, deep sea cable conductor, a return conductor of similar electrical design extending adjacent said cable conductor from a shore terminal to a point at which the depth of water is sufficient to attenuate external disturbances, within the range of the signaling frequencies employed, to a small fraction of their magnitude at the surface of the sea; a complemental impedance element connected to the return conductor at its sea terminal and having impedance characteristics simulating those of the main cable conductor viewed in the direction to sea at the same point, and receiving apparatus connected to the two conductors at their adjacent shore terminals.

8. In combination, a loaded, long, deep sea cable conductor, a sea return conductor of similar design extending adjacent said cable conductor from a short terminal to a point at sea, an insulated resistance element connected to the sea terminal of said sea return conductor at one terminal, the other terminal of said resistance element being connected to earth, and receiving apparatus connected to the two conductors at their adjacent shore terminals.

9. The combination with a long high speed submarine cable, of receiving and transmitting apparatus therefor at each terminal, a sea earth termination at each terminal located at a relatively great depth and connected to the receiving apparatus at that terminal through a cable paralleling the main cable and similar thereto in electrical characteristics, a second sea earth termination at each terminal located at a lesser depth than said first mentioned sea earth and connected to the transmitting apparatus at that terminal through a relatively short length of cable paralleling the main cable, and switching means at each terminal for associating the main cable alternately either with said receiving or transmitting apparatus at that terminal.

10. The combination with a long, high speed submarine cable, of receiving and transmitting apparatus therefor at each terminal, a sea earth termination at each terminal located at a relatively great depth and connected to the receiving apparatus at that terminal, through terminating impedance and a cable paralleling the main cable and similar thereto in electrical characteristics, a second sea earth termination at each terminal located at a lesser depth than said first mentioned sea earth and connected to the transmitting apparatus at that terminal through a relatively short length of cable paralleling the main cable, and switching means at each terminal for associating the main cable alternately either with said receiving or transmitting apparatus at that terminal.

11. Terminal apparatus for a long, high speed submarine cable comprising receiving and transmitting apparatus having separate sea earth terminations connected thereto respectively, and at different distances therefrom.

12. A terminating impedance for a submarine cable, said impedance being in the form of a cable and comprising a high resistance conductor, insulation resistant to sea water surrounding said conductor, a metallic sheath in contact with the sea water surrounding said insulation and a metallic connection between said resistance conductor and said metallic sheath.

13. A loaded submarine cable and means for diminishing the effect of extraneous interfering electric waves comprising a second conductor adjacent to and paralleling the conductor of the cable extending from a terminal of the cable to a point at sea and terminating at the sea end in a terminating impedance consisting substantially wholly of pure resistance.

14. A loaded submarine cable and means for diminishing the effect of extraneous interfering electric waves comprising a second conductor adjacent to and paralleling the conductor of the cable extending from a terminal of the cable to a point at sea and terminating at the sea end in a terminating impedance consisting substantially wholly of pure resistance, said terminating impedance being located at a point so far removed from the shore end of the cable that the remainder of the cable will be in water of such depth that the effect of said extraneous waves will be negligible.

In witness whereof, I hereunto subscribe my name this 25th day of June A. D., 1923.

JOHN J. GILBERT.